United States Patent [19]

Ward et al.

[11] Patent Number: 4,914,710

[45] Date of Patent: Apr. 3, 1990

[54] MICR DOCUMENT SMEAR TEST MACHINE

[75] Inventors: Leonard G. Ward; Joseph M. Ross, both of Melbourne; Ronald R. Reidenauer, Palm Bay, all of Fla.

[73] Assignee: Storage Technology Corporation, Louisville, Colo.

[21] Appl. No.: 123,115

[22] Filed: Nov. 20, 1987

[51] Int. Cl.[4] .............................................. G06K 9/18
[52] U.S. Cl. ........................................ 382/11; 382/7; 235/449; 271/301
[58] Field of Search .................. 382/7, 48, 11, 62, 64; 235/449, 475, 478, 486; 271/272, 273, 301, 304

[56] References Cited

U.S. PATENT DOCUMENTS

| | | | |
|---|---|---|---|
| 2,731,621 | 1/1956 | Sontheimer | 382/7 |
| 3,846,753 | 11/1974 | Spanjersberg | 382/48 |
| 4,056,263 | 11/1977 | LaWhite et al. | 271/301 |
| 4,087,789 | 5/1978 | Beery | 382/64 |
| 4,167,664 | 9/1979 | Pass | 235/449 |
| 4,260,879 | 4/1981 | Galatha et al. | 235/449 |
| 4,326,705 | 4/1982 | Takahashi | 271/301 |
| 4,385,285 | 5/1983 | Horst et al. | 382/7 |
| 4,684,794 | 8/1987 | Holland-Letz | 235/449 |
| 4,764,976 | 8/1988 | Kallin et al. | 382/7 |

Primary Examiner—Leo H. Boudreau
Assistant Examiner—Jose L. Couso
Attorney, Agent, or Firm—Dorr, Carson, Sloan & Peterson

[57] ABSTRACT

A smear test machine for diagnosing problems associated with reader sorters used to process documents having magnetic ink characters printed thereon includes read heads which are closely juxtaposed to a document transport subsystem adapted to move the document past the read head a preselected number of times as controlled by a solenoid-operated gate.

24 Claims, 2 Drawing Sheets

MICR DOCUMENT SMEAR TEST MACHINE

BACKGROUND OF THE INVENTION

1. Field of the Invention

This invention relates generally to financial document proving, inscribing, and sorting systems, and more particularly to diagnostic apparatus for determining the print quality of indicia upon such documents after the documents have been subjected to a preselected number of passes through a simulated document reader.

2. Description of the Prior Art

As is well known, magnetic ink character recognition, or MICR, was developed in the early 1950s, primarily as the common machine language for bank check handling, when the American Bankers Association commenced writing specifications for a suitable system to be used with the then rapidly developing electronic business machines. Specifically-designed symbols, readily recognizable by any person who writes checks, are used for all numerals and zero with a few additional symbols being used for special coding purposes. To take full advantage of the system, it was necessary to modify to some degree the conventional shapes of the numbers, but generally the numbers can be easily read with the naked eye, thus serving two purposes.

As the MICR-coded documents pass a special reading head, the symbol is converted to a uniquely-assigned waveform, which with further electronic translation can be introduced into a data processing system. Other systems seriously considered by the American Bankers Association before final selection of MICR included binary or bar codes, spot codes, decimal systems, fluorescent ink, magnetic bar code, perforations and notches. The principal criteria against which each system was judged included accuracy, tolerances, printing practicability, customer acceptance, verification, cost, format, and resistance to mutilation and obliteration. For some applications, the well known OCR (i.e., optical character recognition) is preferred over MICR. Nevertheless, while each of the MICR and OCR approaches have their own advantages and disadvantages, the use of MICR in financial document proving, inscribing, and sorting systems is most prevalent.

One major drawback to the utilization of MICR-coded documents, however, is that during their processing by typical reader sorters (e.g., the IBM 1255 Document Processor, or other on-line multi-pocket high speed reader sorters such as the IBM 3890 or IBM 3895) the MICR-coded documents are subjected to high frictional forces when passing through the read heads of the reader sorters. Such high frictional forces tend to smear the magnetic ink, often rendering them unreadable by the reader sorters and thereby forcing the documents to be read and sort manually. As is readily apparent, therefore, it would be desirable to provide apparatus for testing the effects of high frictional forces on MICR-coded documents such that properties of the ink, paper, or process of printing, reading, and sorting the documents could be adjusted to ultimately provide a high quality, non-smearing MICR-coded document.

An easy solution to the above-noted objective would be to utilize reader sorters themselves, such as the IBM 1255, IBM 3890 or IBM 3895, or the processors disclosed in U.S. Pat. No. 4,387,639 or U.S. Pat. No. 4,510,615, to test the effects of the high frictional forces that their read heads would impose upon the MICR-coded documents. Such a solution, however, would necessitate an undesirable amount of downtime from the reader sorter's regularly scheduled processing operations, and would be an extraordinary waste of money since the typical costs associated with such processors is in the range of a quarter of a million dollars. It would also be desirable, therefore, to provide apparatus for testing the effects of high frictional forces on MICR-coded documents wherein the apparatus would be dedicated to such testing and would be relatively inexpensive to manufacture and employ.

SUMMARY OF THE INVENTION

Accordingly, it is a general object of the present invention to provide apparatus for testing the effects of high frictional forces upon a MICR-coded document. More specifically, it is an object of the present invention to provide low-cost apparatus which may be dedicated for use in testing the effects of such high frictional forces in order to ultimately provide a high quality, non-smearing MICR-coded document.

Another object of the present invention is to provide such apparatus which is capable of varying the pressure exerted upon the MICR-coded document while it is juxtaposed to typical read heads.

Still another object of the present invention is to provide such apparatus which is capable of routing the MICR-coded document past the read heads a preselected number of times.

Briefly, the above and other objects according to the present invention are accomplished by a MICR document smear test machine which includes, in general, document transport means for transporting a MICR-coded document past a pair of simulated read heads, means for varying the pressure exerted upon the MICR-coded document as it moves past the simulated read heads, and means for selectively controlling the number of times which the MICR-coded document moves past the simulated read heads.

The document transport means is comprised generally of a band rotated in a first direction about a pair of pulleys, and a pair of roller means, each of which is juxtaposed to a respective one of the simulated read heads in order to compress the MICR-coded document there against, which are adapted to rotate in a second direction counter to the rotation of the band in the first direction. A MICR-coded document is fed into the apparatus supported by means for guiding the document towards the simulated read heads, and is brought into close juxtaposition to the simulated read heads sandwiched between one of the pair of pulleys and the band. Counterrotation of the roller means relative to the band ensures such close juxtaposition, but the pressure which is exerted upon the MICR-coded document by the simulated read heads and their respective roller means is varied by means for adjusting the position of each simulated read head towards and away from its respective roller means. As is conventional, the simulated read heads include a tape foil subsystem which serves both to protect the simulated read heads from damage by the roller means and to protect the simulated read heads from the magnetic ink printed upon the MICR-coded documents.

In accordance with one important aspect of the invention, the MICR document smear test machine is further comprised of means for selectively controlling the number of times which the MICR-coded documents move past the simulated read heads. The controlling means includes a gate disposed in close proximity to the pulley upon which the MICR-coded document is sandwiched at a side of the pulley opposite the simulated read heads. Means, such as a solenoid, selectively controls the gate to allow the MICR-coded document to make a set number of turns around the pulley and past the simulated read heads before such time that the document is ejected. Once the MICR-coded document is so ejected, it may be visually checked to determine whether the magnetic ink has smeared or it may be further passed through an operational read head to determine whether actual read errors will occur.

Other objects, advantages, and novel features according to the present invention will become more apparent from the following detailed description thereof when considered in conjunction with the accompanying drawings, wherein:

DETAILED DESCRIPTION OF THE INVENTION

Figure 1:
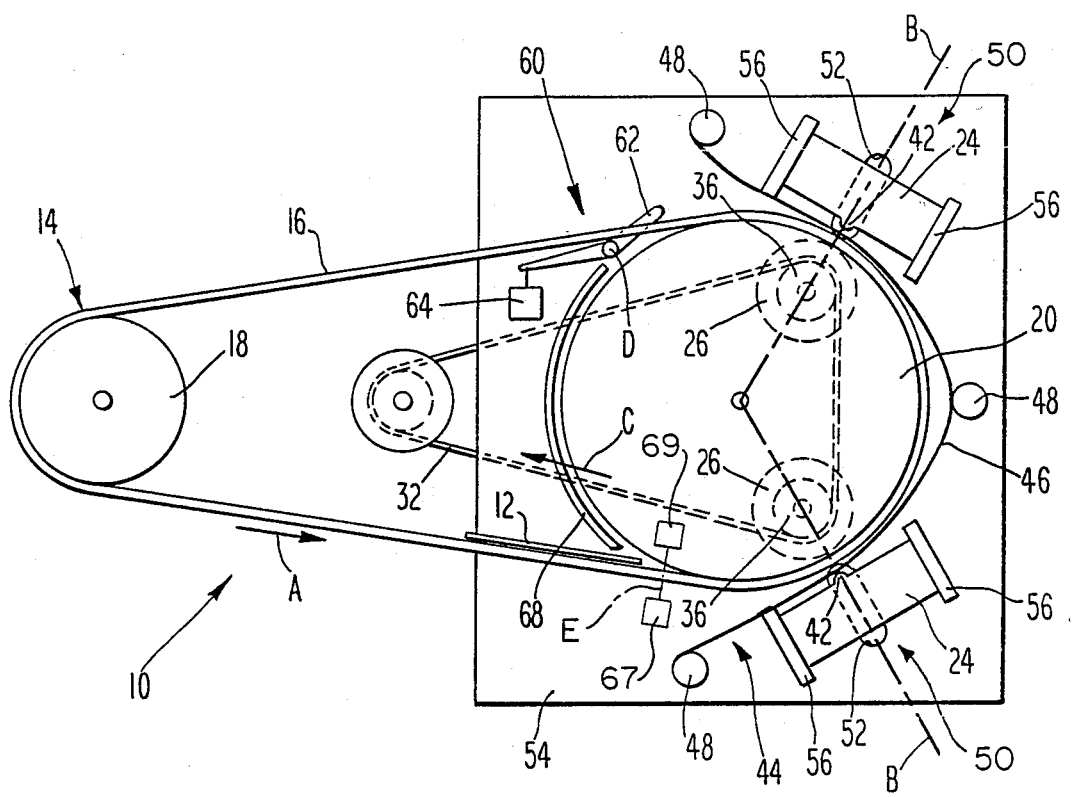
FIG. 1 is a top view of a MICR document smear test machine according to the present invention.
Figure 2:
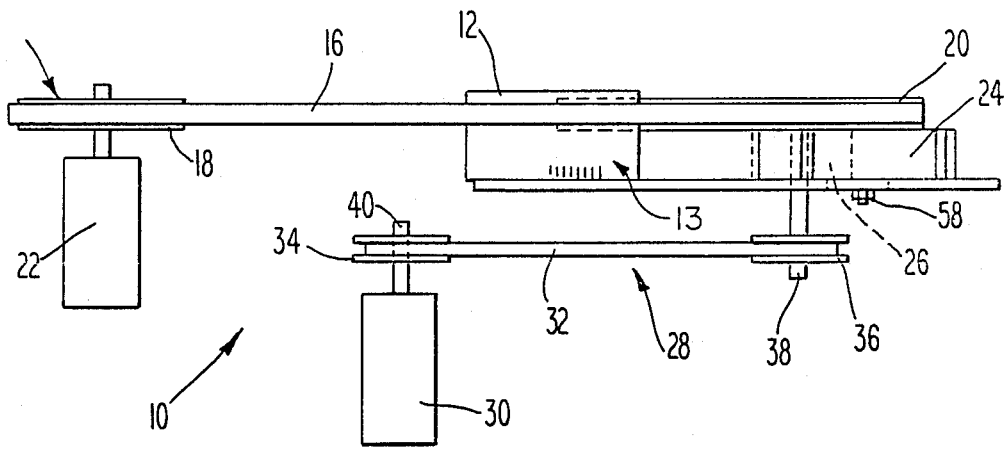
FIG. 2 illustrates a side view of the MICR document smear test machine shown in FIG. 1, taken along the lines 2—2.

Referring now to the drawings, wherein like characters designate like or corresponding parts throughout the several views, there is shown in FIGS. 1 and 2 a MICR document smear test machine 10 for testing the effects of high frictional forces upon a MICR-coded document 12 having data 13 printed in magnetic ink in a portion thereof. The machine 10 includes document transport means 14 comprised generally of a flexible steel band 16 rotatable in a first direction A about a pair of pulleys 18 and 20.

The smaller of the two pulleys 18 and 20 comprises a band drive pulley which is driven by a band drive motor 22 as will be explained in greater detail herein below. On the other hand, the larger of the two pulleys 18 and 20 comprises a band idler pulley which is used to move the MICR-coded document 12 in close juxtaposition past a pair of simulated read heads 24, sandwiched between the belt 16 and the band idler pulley 20.

In order to ensure such close juxtaposition, and to permit a bent or wrinkled MICR-coded document 12 to be flattened out against the simulated read heads 24, the document transport means 14 further includes a pair of roller means 26 each of which is disposed beneath the band idler pulley 20 radially inward from its respective simulated read head 24 along line B. As is apparent from FIG. 1, the roller means 26, which are comprised of cylindrical brushes in accordance with a presently preferred embodiment of the invention, are rotated in a second direction C by belt drive means 28 counter to the rotation of the band 16 in the first direction A. The belt drive means 28 is generally comprised of a motor 30 which drives a flexible belt 32 in the second direction C about a belt drive pulley 34 and a pair of roller idler pulleys 36. Each of the roller idler pulleys 36 are coupled to their respective roller means 26 by a roller shaft 38, while the belt drive pulley 34 is coupled for rotation by the motor 30 through a motor shaft 40.

The band 16, in accordance with a presently preferred embodiment of the invention, is driven in the first direction A by the band drive motor 22 at a speed of approximately 400 inches per second. As a result, the band idler pulley 20 (which in the presently preferred embodiment is approximately 8.6 inches in diameter) rotates at approximately 889 revolutions per minute. The motor 30, on the other hand, is rotated at approximately 1950 revolutions per minute in accordance with the presently preferred embodiment of the invention, thereby rotating the belt drive pulley 34 at the same speed and rotating the roller idler pulleys 36 at approximately 3700 revolutions per minute in the second direction C. As will become more apparent from the description of FIG. 3 herein below, such speeds are only illustrative in nature, and may be varied in accordance with the present invention to simulate various operating conditions of a conventional document processor.

In accordance with another important aspect of the present invention, the simulated read heads 24 are each comprised generally of rectangularly-shaped member having a rounded protrusion 42 at a point of tangency with their respective roller means 26. Such a protrusion 42 thereby simulates the conventional shape of a read head, although an operational read head may be alternatively employed.

The MICR document smear test machine 10 according to the present invention also includes a tape foil subsystem 44, as is conventionally used in typical MICR document processors. The tape foil subsystem 44 consists generally of a thin (i.e., about 0.2 mil thick) metallic strip 46 which is incrementally fed between strip drive means 48, and which covers the simulated read heads 24 in the vicinity of the protrusion 42. As is well known, tape foil subsystems such as the subsystem 44 employed herein are used in operational MICR document processors for purposes of protecting the read heads from the high frictional forces encountered during typical operations, and also for purposes of protecting the read heads from collection of magnetic ink smeared upon the read heads by the MICR-coded documents. Conventional strip drive means such as the strip drive means 48, thus, permits incremental movement of the metallic strip 46 such that a clean unsmeared portion thereof covers the read heads. As is also conventional, the metallic strip 46 permits reading of the magnetic ink characters upon the MICR-coded document. One such strip suitable for use as the metallic strip 46 is manufactured by the IBM Corporation as part number 368052.

In accordance with yet another important aspect of the present invention, each of the simulated read heads 24 are adjustably disposed along the lines B such that relative amount of pressure which is exerted upon the MICR-coded document 12 as it passes by the read heads 24 may be varied. Such variance in this pressure permits a variety of different test conditions for the MICR document smear test machine 10. Means 50, in accordance with the present invention, for varying this pressure are comprised generally of a slot 52 formed along the lines B in the machine 10 (e.g., formed in a support plate 54 for the MICR-coded document 12) and guide means 56 mounted to the support plate 52 on both sides of the simulated read head 24 such that a means 58 for mounting the read head 24 to the support plate 54 is movable radially inward towards the center of the band idler pulley 20 or radially outward therefrom along the line B. Although other various means for varying the pressure exerted upon the MICR-coded document 12 may be utilized without departing from the scope of the present invention, the pressure varying means 50 described herein above is both simple in nature, as well as inexpensive to manufacture.

Figure 3:
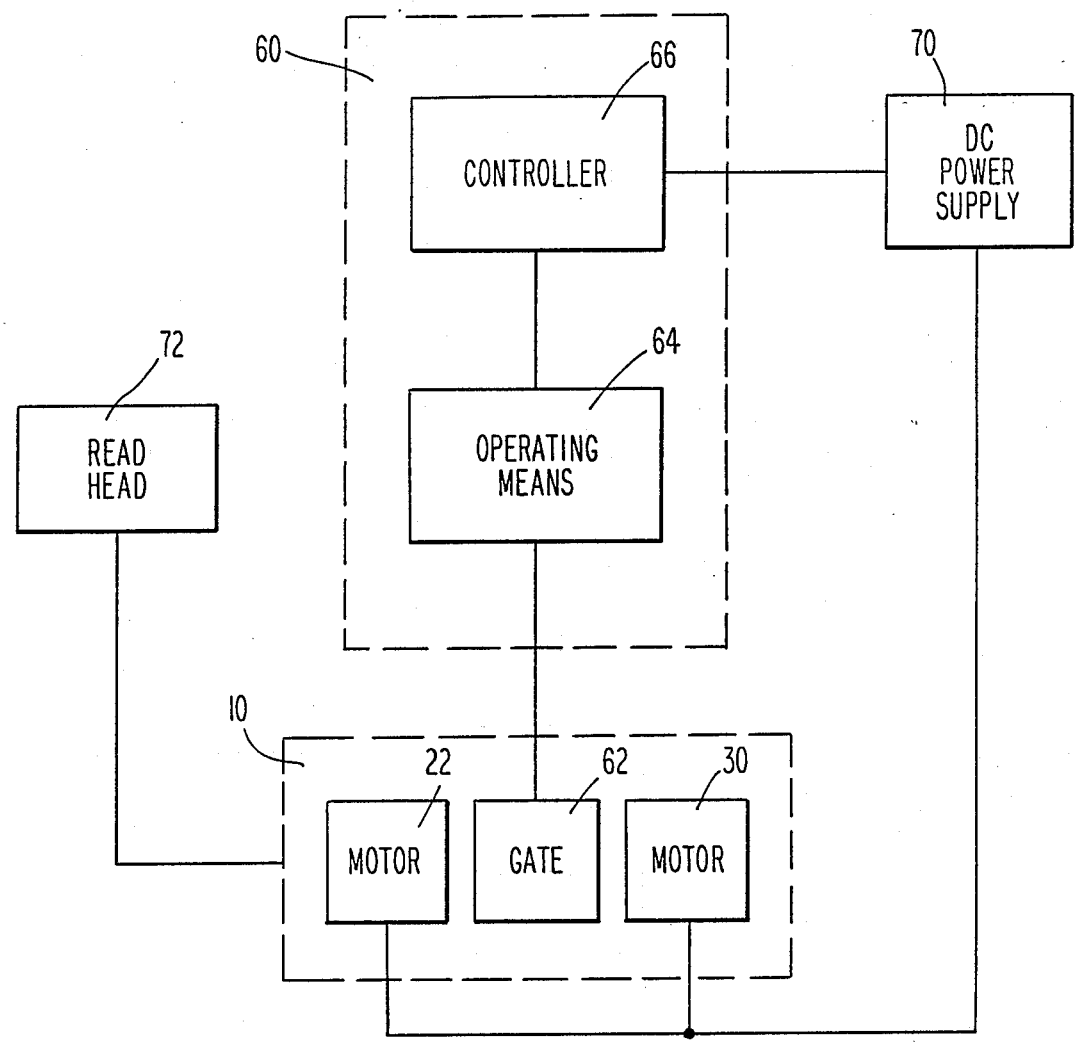
FIG. 3 is a block diagram of the MICR document smear test machine shown in FIGS. 1 and 2, incorporating means for selectively controlling the number of times through which a MICR-coded document can pass.

In accordance with still another important aspect of the present invention, and referring now also to FIG. 3, the MICR document smear test machine 10 further comprises means 60 for selectively controlling the number of times that the MICR-coded document 12 is moved by the document transport means 14 past the simulated read heads 24. The selective controlling means 60 is comprised generally of a gate 62 disposed along a side of the band idler pulley 20 opposite from the simulated read heads 24, means 64 for operating the gate 62, and a controller 66 which is operatively coupled to the means 64 for operating the gate 62. In accordance with a presently preferred embodiment of the invention, the means 64 comprises a conventional solenoid, while the controller 66 comprises a conventional microprocessor.

A selected number of passes (e.g., 10, 25, 50, 100, etc.) is entered into the controller 66 by the operator of the MICR document smear test machine 10, thereby permitting the MICR-coded document 12 to be moved by the document transport means 14 described herein above past the simulated read heads 24. Optical sensor means, such as a photoemitter 67 and a photoreceiver 69 which is coupled to the controller 66, emits a beam of light E which is broken by the MICR-coded document 12 each time it rotates in front of the read heads 24. In such a manner, the number of passes is easily counted. After the selected number of passes has been made, the controller 66 activates the means 64 comprising the solenoid, whereupon the gate 62 is pivoted about a point D to preclude further movement of the MICR-coded document 12 around the band idler pulley 20 and to eject the MICR-coded document 12 from the MICR document smear test machine 10 for further analysis as to the print quality of the magnetic ink characters after exposure to the high frictional forces of the selected number of passes through the document transport means 14. In order to assist in the movement of the MICR-coded document 12 through the document transport means 14, the MICR document smear test machine 10 according to the present invention may also incorporate guide means 68 attached to the support plate 54.

As is also shown in FIG. 3, the controller 66 is operatively coupled to a DC power supply 70 such that speeds of the band drive motor 22 and the motor 30 which drives the belt 32 can be selectively varied in order to further provide a number of different test conditions which may have an effect on the print quality of the magnetic ink characters upon the MICR-coded document 12. While the MICR-coded document 12 may be visually analyzed after its ejection from the document transport means 14 to determine such print quality, the MICR document smear test machine 10 according to the present invention further includes means 72, for determining the print quality of the magnetic ink characters upon the MICR-coded document 12 which has been moved a selected number of times past the simulated read heads 24. The print quality means 72 may be comprised of a conventional print quality analyzer, such as the Model 404-MICR "SignaMeasure 1" manufactured by 1 and 1 Systems, Inc., or may be comprised of an operational read head in order to determine actual read errors. Since such conventional print quality analyzers are not as sensitive as operational read heads, however, the operational read is preferred. Use of a print quality analyzer for the print quality means 72, on the other, provides more diversified data for an overall indication of print quality.

Obviously, many modifications and variations of a MICR document smear test machine are possible in light of the above teachings. For example, while the simulated read heads 24 as shown in FIG. 1 are juxtaposed to the band idler pulley 20 separated by a preselected arc of 120 degrees, the specific dispositions shown herein may be varied to more accurately simulate the conditions of a particular document processor. In such a manner, the pressure varying means 50 may further comprise a means for the preselected arc. It is, therefore, to be understood that within the scope of the appended claims, the present invention may be practiced otherwise than as specifically described herein.

What we claim is:

1. Diagnostic apparatus for simulating movement of a magnetic ink character recognition (MICR) coded document through a reader sorter, the MICR-coded document having magnetic ink characters printed thereon along a portion thereof, comprising:
    a pair of read heads mounted upon said support plate in a predetermined relationship adapted to read the portion of the MICR-coded document having the magnetic ink characters printed thereon;
    document transport means for moving the MICR-coded document past said pair of read heads, closely juxtaposed thereto;
    means for varying a pressure exerted upon the MICR-coded document as it moves past said pair of read heads, wherein said pressure varying means comprises:
        a pair of slots formed in said support plate, each said slot extending in a direction towards said document transport means:
        means for coupling each of said pair of read heads respectively to one of said pair of slots, wherein each said read head is adjustably movable in directions towards and away from said document transport means; and
        means for guiding said pair of read heads coupled to said slots; and
    means for selectively controlling the number of times which the MICR-coded document moves through said document transport means past said pair of read heads.

2. The diagnostic apparatus according to claim 1, wherein said pair of read heads comprises simulated read heads.

3. The diagnostic apparatus according to claim 1, wherein said document transport means comprises:
    a first drive motor;
    a first drive pulley mounted for rotation in a given plane by said first drive motor;
    a first idler pulley mounted for rotation about a predetermined axis in close proximity to said pair of read heads, said first idler pulley and said first drive pulley being disposed in the same plane of rotation;
    a band coupled for rotation in said plane of rotation about said first drive pulley and said first idler pulley, wherein the MICR-coded document is sandwiched between said first idler pulley and said band to be closely juxtaposed to said pair of read heads; and roller means for compressing the MICR-coded document, sandwiched between said first idler pulley and said band, against said pair of read heads.

4. The diagnostic apparatus according to claim 3, further comprising means for guiding the MICR-coded document towards said pair of read heads.

5. The diagnostic apparatus according to claim 3, wherein said roller means comprises:
a pair of cylindrical brushes, each said brush being mounted for rotation about respective axes of rotation disposed radially inward from a respective one of said pair of read heads towards said predetermined axis;
a second drive motor;
a second drive pulley mounted for rotation by said second drive motor;
second and third idler pulleys, each said second and third idler pulley being coupled to rotate a respective one of said pair of brushes; and
a belt coupled for rotation in another plane about said second drive pulley and said second and third idler pulleys.

6. The diagnostic apparatus according to claim 5, wherein said other plane of rotation is parallel to and beneath said given plane of rotation.

7. The diagnostic apparatus according to claim 5, wherein said first idler pulley is rotated by said band in a first direction about said predetermined axis.

8. The diagnostic apparatus according to claim 7, wherein said pair of brushes are rotated by said belt in a second direction about their respective axes, said second direction being counter to said first direction.

9. The diagnostic apparatus according to claim 3, wherein said pair of read heads are disposed radially outward from said predetermined axis separated each from the other by a preselected arc.

10. The diagnostic apparatus according to claim 9, wherein said preselected arc comprises approximately 120 degrees.

11. The diagnostic apparatus according to claim 1, wherein each said read head further comprises a protruding portion proximate to a point at which the portion of the MICR-coded document having the magnetic ink characters printed thereon is tangent to said read head.

12. The diagnostic apparatus according to claim 1, further comprising a tape foil subsystem adapted to cover said pair of read heads along portions thereof exposed to the portion of the MICR-coded document having the magnetic ink characters printed thereon.

13. The diagnostic apparatus according to claim 12, wherein said tape foil subsystem comprises:
a thin metallic tape adapted to transmit magnetic information from the magnetic ink characters to said pair of read heads; and
means for incrementally moving said thin metallic tape past said pair of read heads.

14. The diagnostic apparatus according to claim 1, wherein said selective controlling means comprises:
a gate disposed in close proximity to said document transport means, said gate being adapted to preclude movement of the MICR-coded document through said document transport means; and
means for controlling said gate.

15. The diagnostic apparatus according to claim 14, wherein said gate control means comprises:

a solenoid coupled to said gate;
a controller adapted for input of a preselected number corresponding to the number of times which the MICR-coded document moves through said document transport means, said controller upon the occurrence of said preselected number activating said gate to preclude further movement of the MICR-coded document through said document transport means; and
optical sensor means coupled to said controller for counting the times which the MICR-coded document moves through said document transport means.

16. The diagnostic apparatus according to claim 15, wherein said controller comprises a microprocessor.

17. The diagnostic apparatus according to claim 15, wherein said optical sensor means comprises:
a photoemitter adapted to emit a beam of light across a path through said document transport means upon which the MICR-coded document passes; and
a photoreceiver adapted to receive said beam, said MICR-coded document breaking said beam to count each time is passes there through.

18. The diagnostic apparatus according to claim 14, further comprising means for determining print quality.

19. The diagnostic apparatus according to claim 18, wherein said print quality means comprises a print quality analyzer.

20. The diagnostic apparatus according to claim 18, wherein said print quality means comprises an operational read head disposed adjacent to said document transport means and operatively coupled to said gate control means for reception of the ejected MICR-coded document from said document transport means and for determination thereby of actual read errors.

21. Diagnostic apparatus for simulating movement of a magnetic ink character recognition (MICR) coded document through a reader sorter, the MICR-coded document having magnetic ink characters printed thereon along a portion thereof, comprising:
a support plate;
a pair of read heads mounted upon said support plate in a predetermined relationship adapted to read the portion of the MICR-coded document having the magnetic ink characters printed thereon;
document transport means for moving the MICR-coded document past said pair of read heads, closely juxtaposed thereto, wherein said document transport means comprises:
a first drive motor;
a first drive pulley mounted for rotation in a given plane by said first drive motor;
a first idler pulley mounted for rotation about a predetermined axis in close proximity to said pair of read heads, said first idler pulley and said first drive pulley being disposed in the same plane of rotation;
a band coupled for rotation in said plane of rotation about said first drive pulley and said first idler pulley, wherein the MICR-coded document is sandwiched between said first idler pulley and said band to be closely juxtaposed to said pair of read heads; and
roller means for compressing the MICR-coded document, sandwiched between said first idler pulley and said band, against said pair of read heads, wherein said roller means comprises:

a pair of cylindrical brushes, each said brush being mounted for rotation about respective axes of rotation disposed radially inward from a respective one of said pair of read heads towards said predetermined axis;

a second drive motor;

a second drive pulley mounted for rotation by said second drive motor;

second and third drive pulleys, each said second and third drive pulley being coupled to rotate a respective one of said pair of brushes; and a belt coupled for rotation in another plane about said second drive pulley and said second and third idler pulleys;

means for varying a pressure exerted upon the MICR-coded document as it moves past said pair of read heads; and means for selectively controlling the number of times which the MICR-coded document moves through said document transport means past said pair of read heads.

22. The diagnostic apparatus according to claim 21, wherein said other plane of rotation is parallel to and beneath said given plane of rotation.

23. The diagnostic apparatus according to claim 21, wherein said first idler pulley is rotated by said band in a first direction about said predetermined axis.

24. The diagnostic apparatus according to claim 23, wherein said pair of brushes are rotated by said belt in a second direction about their respective axes, said second direction being counter to said first direction.

* * * * *